United States Patent [19]
Daringer et al.

[11] Patent Number: 5,375,695
[45] Date of Patent: Dec. 27, 1994

[54] CURVED-PATH WOVEN-WIRE BELT AND CONVEYANCE METHODS AND APPARATUS

[75] Inventors: Ronald G. Daringer, Cambridge; Stephen D. Wilcox, East New Market, both of Md.

[73] Assignee: Maryland Wire Belts, Inc., Curch Creek, Md.

[21] Appl. No.: 56,875

[22] Filed: May 5, 1993

[51] Int. Cl.$^5$ .............................................. B65G 21/18
[52] U.S. Cl. ..................................... 198/778; 198/848
[58] Field of Search ................................. 198/848, 778

[56] References Cited

U.S. PATENT DOCUMENTS

| | | | |
|---|---|---|---|
| 2,292,663 | 8/1942 | Scherfel | 198/848 X |
| 2,524,328 | 10/1950 | Platt et al. | 198/848 X |
| 2,859,861 | 11/1958 | Sheehan | 198/848 X |
| 3,202,387 | 8/1965 | Andrews et al. | 198/848 X |
| 3,263,799 | 8/1966 | Bascom et al. | 198/848 |
| 3,276,570 | 10/1966 | Hale et al. | 198/848 |
| 3,300,030 | 1/1967 | Scherfel | 198/848 |
| 3,542,188 | 11/1970 | Kinney, Jr. | 198/848 |
| 4,036,352 | 7/1977 | White | 198/848 X |
| 4,866,354 | 9/1989 | Miller | 198/778 X |
| 5,176,249 | 1/1993 | Esterson et al. | 198/848 X |
| 5,191,267 | 3/1993 | Machacek | 198/778 X |

*Primary Examiner*—D. Glenn Dayoan
*Attorney, Agent, or Firm*—Raymond N. Baker

[57] ABSTRACT

Fabricating method for an elongated woven-wire belt for direct-contact dynamic-frictional-drive along an inner perimeter lateral edge portion when the belt is moving in a path which is curved in a lateral direction with respect to its lengthwise direction. A curved path structure for support of such belt is disclosed along with methods of assembly and operation of curved path support structures. Lengthwise collection and extension uniformly across the width of the woven-wire belt is provided, along with selection of direction of movement providing for reversing direction of movement without requiring modification of the belt structure or curved path support structure. Provision is made for selectively controlling rates of movement of the woven-wire belt in a curved path support structure and for controlling rate of movement of the belt when exterior to a multi-layer curved-path tower structure.

22 Claims, 4 Drawing Sheets

CURVED-PATH WOVEN-WIRE BELT AND CONVEYANCE METHODS AND APPARATUS

BACKGROUND OF THE INVENTION

This invention relates to fabrication and utilization of woven-wire belt and work product conveyance structures which enable control of belt travel along a curved-path by dynamic frictional contact between a rotary drive means and a lateral edge portion of the belt.

Prior curved-path conveyance structures have relied on heavy duty linkage means positioned to act along one or both lateral sides of the belt and/or centrally of the belt. Such linkage means are utilized to drive a conveyor belt under tension in the direction of its length (see, e.g., U.S. Pat. No. 3,682,295 which issued on 1/8/72, and U.S. Pat. No. 5,139,135 which issued on 8/18/92).

Driving such belts under longitudinal tension can require special structures which make them less readily adaptable to many uses and less economical to fabricate and operate than the woven wire belt frictional-drive methods and structures of the present invention.

SUMMARY OF THE INVENTION

Further, the present invention facilitates customizing fabrication of conveyance means to conveyance needs, and enables more reliable control of direction of travel and speed during operations through the use of dynamic frictional-drive methods and apparatus.

BRIEF DESCRIPTION OF THE DRAWINGS

The above and other contributions and advantages are considered in more detail while describing specific embodiments of the invention with reference to the accompanying drawings; in which.

DETAILED DESCRIPTION OF THE PREFERRED EMBODIMENTS

Prior curved-path conveyor belts often use cross bars to interconnect linkage means across the width and/or along each lateral side of the belt. Those types of linkage means, along with other special drive components such as interconnecting articulated means, are often used to drive the belt under longitudinal tension by introducing longitudinally-directed drive force for curved-path or linear travel.

The woven-wire belt and curved-path conveyance concepts and methods of the present invention require no such interconnecting articulated components to drive the belt during its curved-path travel. The present invention relies on dynamic frictional drive along a single lateral edge of the belt for curved-path travel.

Figure 1:
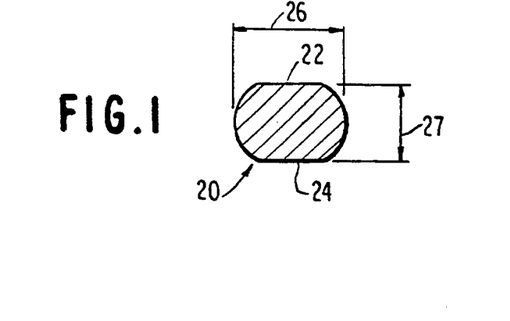
FIG. 1 is a cross-sectional view of a flattened surface wire configuration preferred in accordance with teachings of the present invention.
Figure 2:
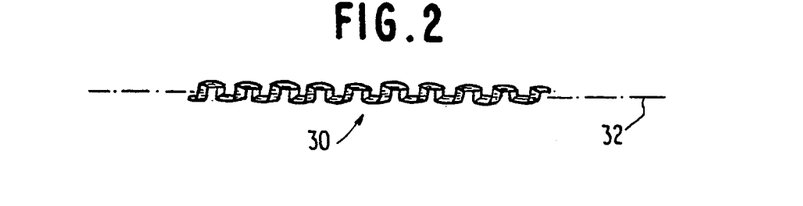
FIGS. 2 and 3 present, respectively, spiral wire and helically-wound loop configurations which are preferred in accordance with teachings of the invention.
Figure 3:
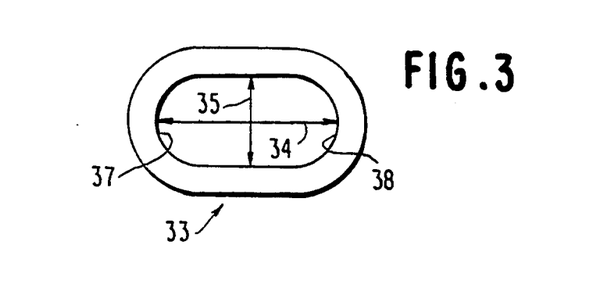
Figure 4:
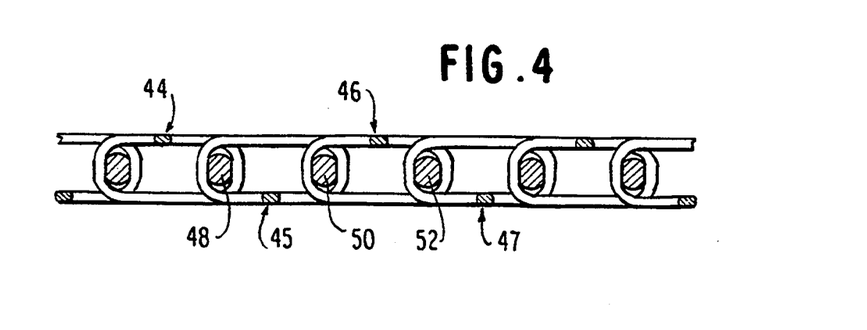
FIG. 4 is a side elevational view for describing partial assembly of a preferred configuration woven-wire belt of the present invention.

In fabricating the woven-wire belt of the invention, wire of preselected gage is preferably shaped as shown in FIG. 1, and helically wound into elongated spiral wires as shown in FIG. 2. Such spiral wires comprise helically-wound loops of uniform cross-sectional dimensions (as shown in FIGS. 3, 4); such loops are uniformly distributed along the centrally located axis of the spiral wire.

Wire 20, with the preferred cross-section shown in FIG. 1, is flat on at least two diametrically opposed surfaces; for example, "upper" surface 22 and "lower" surface 24. In fabricating metal wire belts, round metal wire of uniform diameter (gage) is flattened such that the dimension shown at 26 is preferably from about 1.1 to 1.25 times the original round metal wire diameter, and the dimension shown at 27 can be about 0.75 to 0.90 times such original metal wire diameter.

During helical winding, the flat surfaces 22 and 24 are disposed (as described in more detail in U.S. Pat. No. 4,491,033) as the outer and inner surfaces, respectively, of the helically wound loops of spiral wire 30; such loops are uniformly distributed along its centrally located axis 32 (FIG. 2).

Helically-wound loops of the invention preferably have an elongated-oval toroidal configuration (33) as shown in cross section (FIG. 3) in a plane which is perpendicularly transverse to the centrally located axis of the spiral wire. Each such ellipse-like loop, in accordance with present teachings, is uniformly spaced along, and symmetrically disposed with respect to, the centrally located axis (32) of the spiral wire. The ellipse-like loop configuration defines a major axis 34 and minor axis 35 as seen in cross section in FIG. 3. The interior configuration of each loop presents a bight end 37, 38 at respective opposite ends of major axis 34 within the ellipse-like cross section. The loops can be shaped to have a more rectilinear configuration, both in the direction of the minor axis at each bight end and, also, along the major axis legs as shown in FIG. 4.

Longitudinally contiguous pairs of spiral wires, such as 44–45, 45–46, 46–47, etc. in FIG. 4 are woven together using connector rods, such as 48, 50, and 52, inserted within overlapping bight ends of each pair of spiral wires. The connector rods extend laterally across the full width of the belt and the major axis legs of the spiral wire loops extend in the general lengthwise direction of a belt being fabricated (as best seen in FIG. 5).

Figure 5:
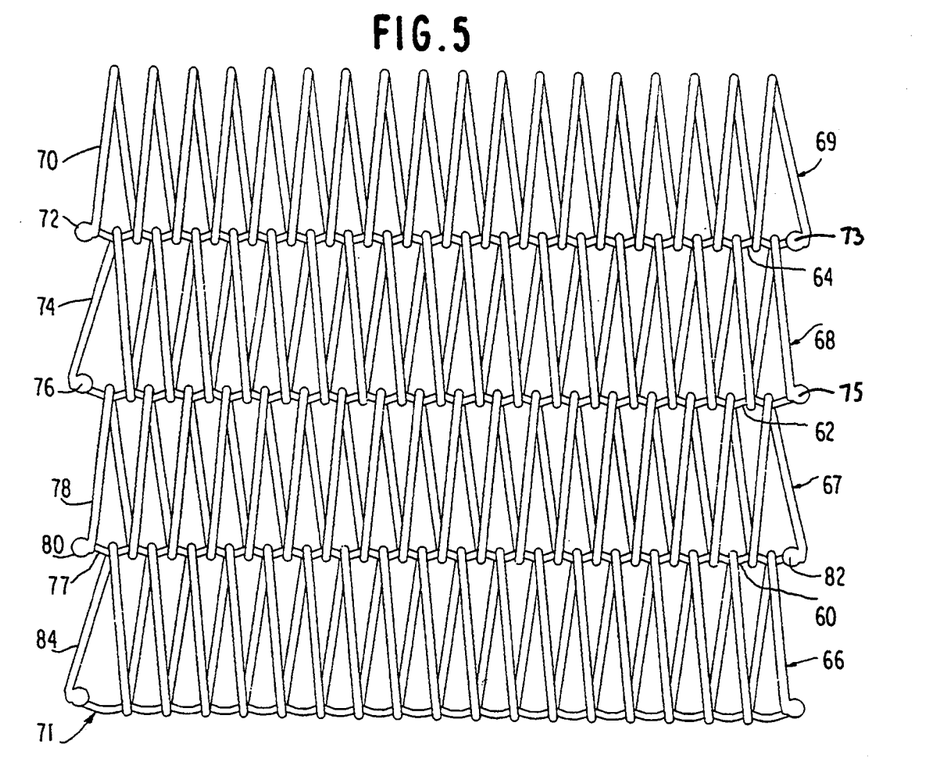
FIG. 5 is a plan view for describing fabrication methods of the invention for woven-wire integral spiral wire and connector rod units.
Figure 6:
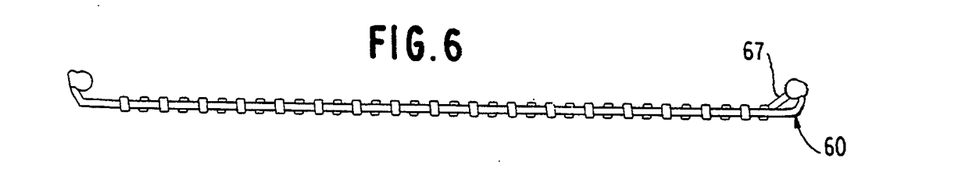
FIG. 6 is a widthwise cross sectional view of the woven-wire belt of FIG. 5.
Figure 7:
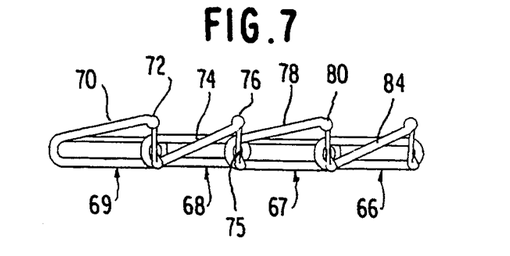
FIG. 7 is a side elevational view of a vertically-oriented lateral side portion for a woven-wire belt of the type shown in FIG. 5 for describing fabricating methods.
Figure 8:
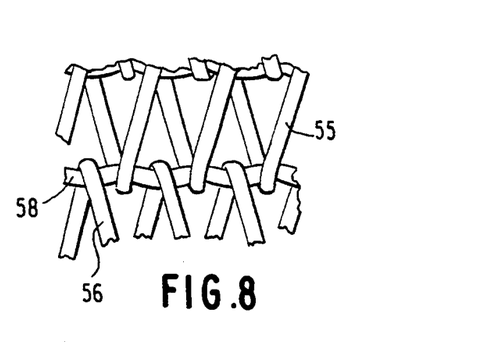
FIG. 8 is a plan view showing another weave for woven-wire belt for use with concepts of the invention.

The loops of each of the spiral wires of the embodiment of FIGS. 5-7 are wound in the same direction (such as, all "left" hand or all "right" hand) which is best seen in the plan view of FIG. 5. In a "balanced weave," as shown in FIG. 8, right hand spiral wires (such as 55) and left hand wound spiral wires (such as 56) alternate along the length of the belt and pairs of such spiral wires are woven together by a connector rod (such as 58).

As taught herein, the loops of the woven wire belt, have a uniform "pitch"; that is, the same number of loops per unit length along the centrally located axis of the spiral wire. A relatively open weave is shown for both the unidirectional weave of FIG. 5, and the "balanced-weave" of FIG. 8, in order to facilitate describing the method of belt fabrication.

Significant contributions relate to customizing capabilities, which are facilitated by the ease of selection and the various combinations of interacting mechanical aspects and belt characteristics made available because of the invention. For example: the pitch of the loops of the spiral wires, loop configurations, fabricating spiral wire and connector rod units and edge configurations, characteristics of rotary drive elements, etc., enable wide applicability and adaptability of the concepts taught to differing conveyance needs.

For example, the uniformity of loop distribution along the central axis of each spiral wire helps to provide, along with other features of the invention, for a smooth and orderly interaction of spiral wire-connector rod units (shown in FIG. 5). Such interaction is especially important upon entering a curved path as the belt is being collected lengthwise contiguous to its inner periphery along such curved travel path. Also, the belt is fabricated to expand uniformly upon leaving such curved path and return to a lengthwise extended disposition. Such lengthwise collection and extension aspects are discussed in more detail later, in relation to FIGS. 9, 10, and 11.

As seen in FIG. 4, a connector rod (such as 50, 52) is located at each bight end of the loops of each spiral wire (such as 46). The internal configurational dimensions, in particular the major axis dimension of the loops and selection of the gage of the connector rods, are factors in quantitatively determining to what extent the woven-wire belt can be "collected" when entering a laterally curved path in a substantially horizontal plane.

Woven wire belt of the invention can follow a curved travel path in either lateral direction. Thus the belt of FIG. 5 is shown in a serpentine disposition in FIG. 9 to illustrate that the belt can accommodate curved path movement in either lateral direction of a generally horizontal plane. FIGS. 6 and 7 are for describing fabrication of an edge portion on one or both lateral sides of a woven-wire belt. A "vertically-oriented" edge portion can be provided angled at substantially 90° to the generally horizontally-oriented work product carrying surface of the belt.

In accordance with present teachings, such edge portion is fabricated to be a unitary part of the woven wire belt, not a separately connectable or articulated means. The invention enables dynamic frictional drive by relative-movement contact along a lateral edge of the belt, eliminating any requirement for specially-interconnected longitudinal drive components for curved-path travel. The relative movement between the drive means and the driven belt comprises the dynamic frictional drive characteristic of the invention which coacts with features fabricated into the woven wire belt.

During assembly of the belt shown in FIG. 4, a pair of spiral wires, such as 44 and 45, are placed with loop portions at longitudinally contiguous bight ends overlapping across the width of the belt. A bight portion of each spiral wire overlaps the other so as to enable reception of a connector rod, such as 48, which is inserted within the overlapping portions to extend widthwise of the belt being assembled and slightly beyond each lateral side of such belt.

Helically-wound loops at the remaining bight end of spiral wire 45 are placed in overlapping relationship with bight end portions of the loops of the next adjacent spiral wire (such as 46), and connector rod 50 is inserted within such overlapping bight ends in the manner described.

Assembly of woven-wire continues in that manner with spiral wire 46 being placed in overlapping relationship at its remaining bight end with the next adjacent spiral wire 47 and connector rod 52 being inserted in the resulting overlapping loop portions. That type of assembly, using pairs of spiral wires 44–45, 45–46, 46–47 and connector rods 48, 50 and 52 (as shown in FIG. 4), continues throughout the minimum desired length of the travel path for the belt.

A preferred configuration for the connector rods, which facilitates the smooth collection and expansion taught herein, can be best seen in FIG. 5. Connector rods 60, 62, 64 are formed with a uniformly undulating configuration along the length of each to provide a seat (and angled guidance into that seat) for each loop of the next spiral wire; those seats are uniformly spaced along the axis of the connector rod. That connector-rod configuration facilitates orderly movement of helical loops in relation to each other during lengthwise collection and extension of the woven wire belt. For example, during lengthwise collection movement of the belt, spiral wire 66 moves in the direction of connector rod 60 for nesting, at least in part, within spiral wire 67 upon entering a curved path. And, spiral wire 67 nests, at least in part, within spiral wire 68 in such a curved path. Such "nesting" arrangements contribute to the uniform lengthwise collection action made available by the invention in gradually-changing small increments across the width of the belt (as shown and described in more detail in relation to FIG. 9).

Spiral wires are initially assembled with connector rods, as shown in FIG. 4, in preparation for continuation of fabrication for present purposes as embodied in FIGS. 5–7. Steps, such as integral joining of spiral-wire and connector-rod components at lateral sides of the belt, can be carried out in segments during initial assembly; or the full length of an initially-assembled belt can be laid out with each lateral side of the belt accessible for the integral joining at lateral sides, along with the other steps taught for completing fabrication in accordance with the invention. Establishing a vertically-oriented drive surface, at one or both lateral sides of the belt, comprises part of that fabrication; the steps for vertical orientation of side portions can be carried out in conjunction with the integral joining.

A vertically-oriented drive surface will, generally, extend vertically upwardly from a horizontally-oriented work product carrying surface; however, there are circumstances where having a drive surface extend vertically downwardly could be useful. The character of the surface of a vertically-oriented rotatable frictional drive source can be coordinated with the dynamic frictional drive surface. A vertically-oriented lateral edge is preferably at or near perpendicular to the generally horizontal plane of the work-carrying surface of the belt. When providing a vertically-oriented drive surface portion it is preferred to present a flat surface for each spiral wire and rod integral unit of the woven wire belt. The vertical edge dimension of a woven-wire belt can be selected to accommodate articles to be carried; in general, edge portion dimensions can vary in a range of about one-half to about ten times the minor axis dimension of the woven wire belt.

The belt and drive edge means of the integral spiral wire and connector rod units are described with reference to FIGS. 5–7. In the widthwise cross sectional view of FIG. 6, a distal end of spiral wire 67 is shown integrally joined with a contiguous distal end of connector rod 60. Such points of joiner can be used for driving the belt in a curved path by selection of the driving surface to avoid vibration. Preferably, however, connector-rod and spiral-wire portions are joined to provide some-oriented drive surface. However, in working with metal wire, integral joining can be carried out either before or after orienting of the connector rod and spiral wire portions to form the desired vertically-oriented contact surface. A height dimension for the vertical surface portion of the belt related to the minor axis loop dimension can be seen in the side elevational view of FIG. 7.

In a specific embodiment of FIG. 5, spiral wire 69 is prepared to desired length so as to enable providing a portion contiguous to at least one distal end of the wire for the vertically-oriented drive surface. The flattened upper surface of a major axis leg at the end of loop 70 can be angled into a vertically-oriented lateral side portion. Such major axis leg can be turned to present its flattened upper surface as the vertically-oriented contact surface of the belt. A single major-axis leg, angled slightly vertically as shown in FIG. 7 provides a suitable height for the vertically-oriented drive surface portion of the belt.

Rod 64 is cut to provide an extended portion near its distal end which is oriented, or in the case of metal wire, can be bent. Such that the portion of the rod 64 contiguous to its distal end is brought into contact with the distal end portion of the spiral wire 70, which is joined at 72 to form integral unit 69.

Forming or cutting of the spiral wires and rods to desired lengths can be carried out initially, followed by integral joining of such distal ends. The spiral wire and connector rod as joined present a lateral edge contact portion for dynamic frictional drive.

Referring to FIG. 5, the distal end portion of a major axis leg of spiral wire 74 is integrally joined to the distal end of portion 75 of rod 62; such distal ends are integrally joined at 76 to form integral unit 68. Integral joining is carried out at both lateral sides the belt. For example, corresponding distal ends of spiral wire 78 and connector rod 60 are integrally joined at each lateral side (80, 82) to form integral unit 67 of the belt.

The same measures, forming or cutting to length and integral joining, with or without vertical orientation, are carried out, to form a series of integrally-joined rod and spiral wire units throughout the desired length for the belt. Each such integral unit is capable of pivoting, at the remaining bight end of its respective integrally-joined spiral wire, about the next adjacent connector rod. For example, the integral unit 66 consisting of spiral wire 84 and rod 71 is pivotable about rod 60.

One lateral edge of the belt is sufficient for dynamic frictional drive of the belt in a curved travel path, including such frictional drive of loaded belt through a multi-layer curved-path treatment tower. Vertically-oriented means can be provided for a single drive edge, or can be provided along both lateral sides of a belt, to assist in load confinement. However, if no vertically-oriented surface is desired for such confinement or other purpose, the spiral wires and rods can be cut so that their adjacent distal ends can be integrally joined to remain contiguous to the generally horizontal carrying surface plane of the belt.

In practice, a vertically-oriented belt edge drive surface enables greater selection of rotary drive surface means to accommodate curved path structures of single or multiple layers. Present concepts enable the belt to be frictionally driven selectively in either direction of its length. That is, the direction of frictional drive can be readily reversed so as to change from one direction to another about a cylindrical configuration defined by a tower structure such as that shown in FIGS. 10 and 11. More specifically, the change in direction using dynamic frictional drive concepts does not require any change in methods or means along the lateral side drive surface. Use of present teachings facilitate control of the dwell-time along curved paths or along multiple layers within a treatment tower; and dwell time can be readily prolonged by using more than one passage of a given travel path using the readily reversible direction features.

A lateral edge frictional drive surface portion of the belt can be oriented upwardly or downwardly with respect to the work product carrying surface. A vertically-upwardly-oriented drive portion on both lateral sides of the belt helps in the containment of small, individual articles while processing or treatment is being carried out with curved travel paths for the woven-wire belt through an enclosure.

Figure 10:
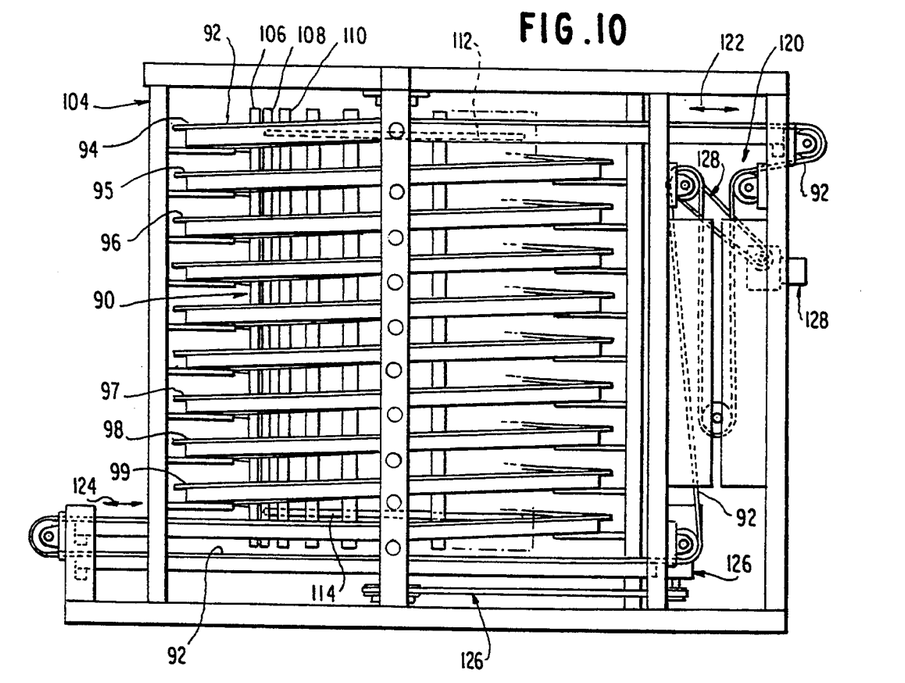
FIG. 10 is a schematic elevational view, including portions in section, for describing methods of assembly and operation of curved-path tower structures of the invention.
Figure 11:
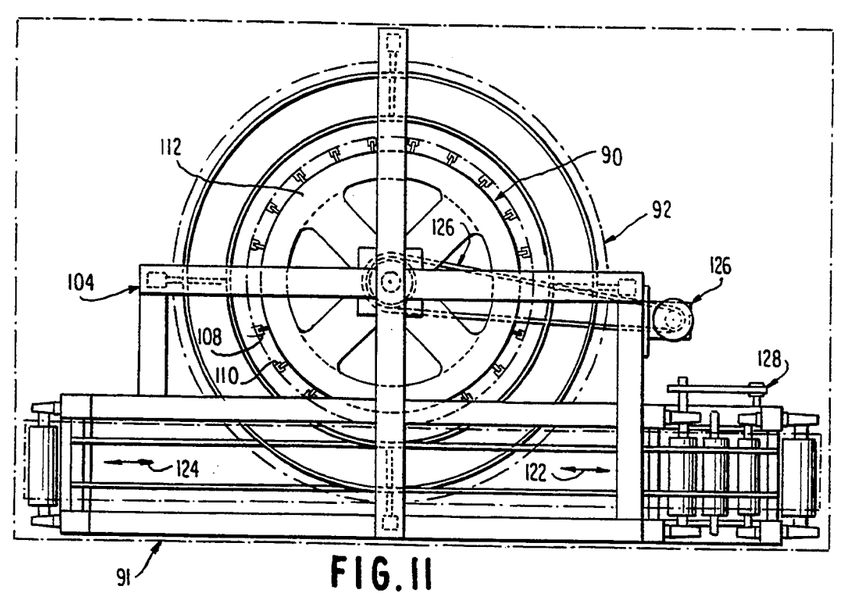
FIG. 11 is a schematic top plan view, with portions in section, of the structure of FIG. 10.

Curved-travel path tower structures, as shown in FIGS. 10 and 11, would ordinarily be enclosed for purposes of thermal treatment, or for selected gaseous atmosphere treatment with or without controlling temperature, or for radiation treatment, and/or for other treatment processing of articles. Powdered metal or powdered ceramic parts of complex, for example, are subject to heat treatment in a controlled gaseous atmosphere. Such examples are indicative of the types of processing which can take place using enclosed curved travel path structures and belt drive concepts of the invention. Such concepts readily enable a wide selection of treatment times within a single curved-path structure by varying linear speed of the belt and/or through use of the readily reversible features to enable repetitions of passage. Also, a multiple curved-path tower structure as shown can be connected in tandem with other such structures. For example, an exit path at an upper level of the tower as shown in FIGS. 10, 11 can be directed to a second curved travel path tower which returns the treated articles to the level at which they were introduced into the first tower. Connecting in that manner enables dynamic frictional drive on the same lateral side of the belt through a plurality of interconnected towers of the type shown. Such tower structure(s) can also be used as accumulators for timing the movement of articles between processing lines, free of enclosures for treatment of the articles.

"Integral joining" of a rod and wire takes place on both lateral sides such that an integrally joined spiral wire and connector rod becomes, in effect, unitary. If metal spiral wire and connector rod are used, the distal ends are welded. Should plastic spiral wire and rod be selected for a special application, integral joining can be accompanied with curing or "setting" of the plastic material such that the distal ends of the two plastic components become unitary. No separable interlocking components are required because of the dynamic frictional driving action on the integrally joined rod and spiral wire units. Each such integral unit presents a unitary portion for dynamic frictional drive purposes.

The spiral wire of each integral unit is integrally joined at both of its lateral ends to a connector rod as shown in FIG. 5. The resulting integral unit can pivot (as a unit) about the connector rod of the next integral unit. That arrangement continues throughout the desired length of the belt. Each such integrally-joined spiral wire and connector rod can pivot as a unit about the remaining connector rod (of the pair within the spiral wire) at the remaining bight end of its helically-wound loops. That remaining connector rod is joined to the next spiral wire forming the next adjacent integral unit.

The woven-wire initial assembly and fabrication methods are continued throughout the desired length of the travel path with each connector rod 60, 62, 64 being part of an integral unit; integral unit 66 pivots about rod 60, unit 67 pivots about rod 62, unit 68 pivots about rod 64.

Figure 9:
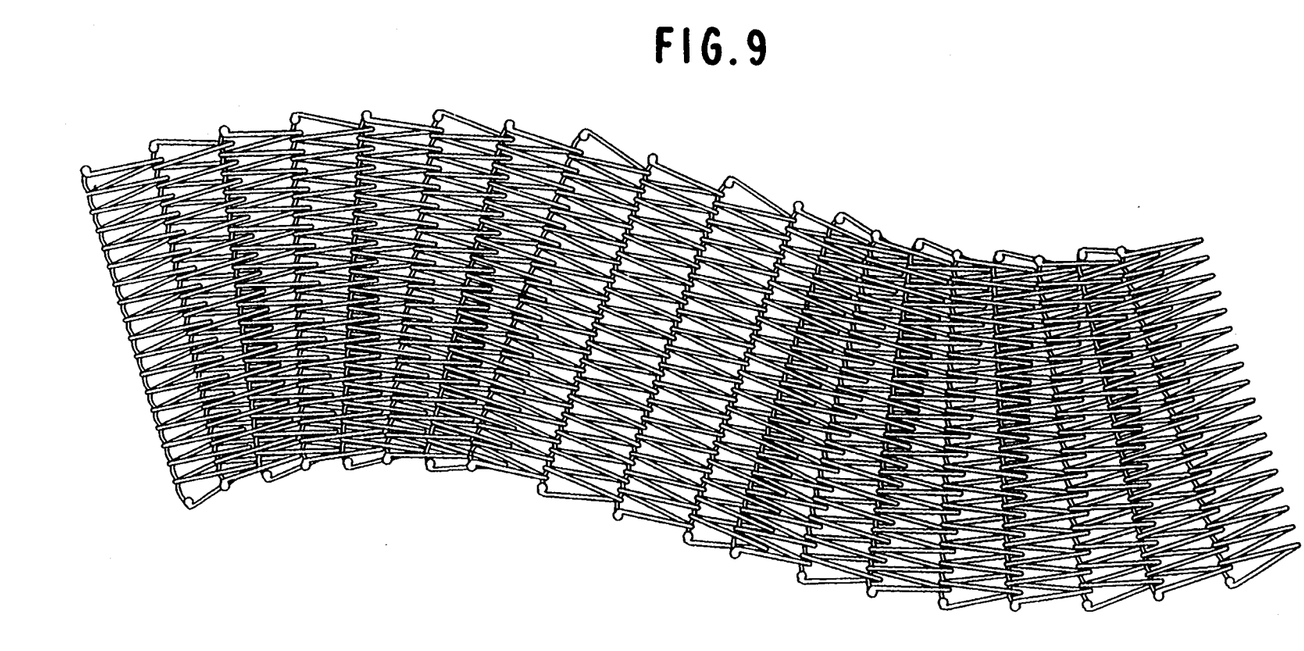
FIG. 9 is a plan view of the woven-wire belt of FIG. 5 in varying horizontally-curved dispositions along its length for illustrating incremental collection and extension actions of belt components across the width of the belt during travel into, through, and out of, curved paths.

As shown by FIG. 9, each integral unit can be collected within the next adjacent integral unit for curved-path travel, with such collection occurring in uniformly-graduated, small incremental amounts across the belt width. Note also in FIG. 9 that curved-path travel can take place in either lateral direction. The nesting of contiguous integral units takes place on the inner perimeter of a curved path while the belt remains substantially extended at the outer perimeter.

During lengthwise collection action of integral units, an integral unit can be collected to a location contiguous to contact with the next adjacent integrally-joined connector rod. The collecting and extending actions take place smoothly and orderly in small increments across the width of the belt when the belt is traveling into and out of a curved path.

The orderly, smoothly-operating, small increment uniformly graduated collecting and extending action described above, and shown in FIG. 9, is facilitated by the uniform pitch of the loops and other contributions to fabrication and operation, such as rod crimping, selection of uniform spiral wires and rods for integral joining into uniform units, control of relative movement for dynamic frictional drive purposes, and the like.

Lengthwise collection of integral units is most significant quantitatively along the inner perimeter of the belt when in a curved path. The amount of collection progressively diminishes uniformly across the width of the belt as it extends between the curved paths (as best seen in FIG. 9). The amount of collection along the inner perimeter is determined by such factors as the radius (diameter) of the curved travel path, wire and rod gages, spiral wire hoop dimensions, spiral wire hoop configuration, and uniformity of components, as described earlier.

Referring to FIG. 7, a major axis leg portion of the spiral wires (70, 74, 78, 84) of each respective integral unit (69, 68, 67, 66) is shown. The previously "upper" flattened surface (22 of FIG. 1) of each such peripherally-located leg can be disposed to increase the vertically-oriented flattened contact surface for dynamic frictional drive purposes on the inner perimeter of a curved path.

The collection action of integral units can be visualized from FIGS. 5, 7 and 9, a substantially continuous contact surface can be presented along the inner perimeter of a curved path. The collected side edge drive sources comprise only the points of joinder or can be extended to approach the length of a single major-axis leg. Either can contribute a substantially continuous contact surface on the inner perimeter of the belt, and can be coordinated with the rotatable drive surface for the curved path.

In effect, the curved path is defined at least in part by the periphery of a rotatable driving surface. A solid cylindrical, rotatable drum-like surface for configuration 90 in the tower structure embodiment of FIGS. 10 and 11 would provide smooth frictional drive by contact solely with the points of joinder for rods and spiral wires along the edge of a belt with no vertical orientation. Use of solid surface central cylinders can be more practical for small diameter drive sources.

The specifications for the woven wire belt are selected along with the drive surface to maintain, or otherwise provide for, substantially continuous contact surface along the inner perimeter of the belt. Spacing, if any, along such inner perimeter, and the circumferential dimensional characteristics of the rotary drive-elements utilized, are controllable and interrelated for smooth dynamic frictional drive; that is, to avoid vibration in a lateral direction being introduced by the frictional drive.

The height of the drive belt edge surface, while generally in the range from the height of a joinder point to about four times the minor axis dimension of a loop, can be significantly extended to accommodate the geometry of the articles to be carried by otherwise accommodating added height factors.

Rotatable drum configuration 90 of FIGS. 10 and 11 can be substantially centrally located within a tower enclosure indicated generally by interrupted line 91; the enclosure can be readily confined to the more limited space occupied by the tower itself for special treatments at high temperature or the like. Rotatable drive elements can be located along the rotatable drum configuration within the tower enclosure; preferably, the configuration 90 of a single rotatable drum is preferably presented by a plurality of circumferentially-spaced elements.

The continuous-length belt (its outer periphery represented by an interrupted line 92 of FIG. 11) travels with a slightly graded (upwardly or downwardly, depending upon the direction of the belt movement) helical path around the drum. A plurality of belt-support layers (94–99) are established about drum 90 as defined within or without an enclosure (such as 91, shown schematically in FIG. 11). Support frame members, such as 104, are shown in FIGS. 10, 11. Tower structures can be located in tandem and interconnected by the same woven wire belt.

As taught herein, use of an internally open framework for defining the curved path cylindrical drum configuration 90, as illustrated by FIG. 10, rather than a solid-surface drum facilitates atmosphere and heat distribution for uniformity of treatment. Also, it can be difficult and costly to obtain a solid cylindrical surface which will maintain desired uniformity of contact at various levels throughout multiple layers of a curved travel path, especially in larger drum sizes. Note in FIG. 10 that a series of vertically-oriented elongated drive contact members 106, 108, 110, etc. are circumferentially spaced (preferably uniformly) so as to define a substantially cylindrical surface while maintaining an open periphery and open framework for drum configuration 90.

The drive contact members 106, 108, 110, etc. are supported by radially extending frame members, such as shown by interrupted lines at 112, 114 in FIG. 11. Defining a substantially cylindrical configuration surface should not exclude a slightly conical or tapered surface as viewed in a plane which includes the axis of rotation of drum 90, to the extent such a surface can be accommodated by the woven wire belt while achieving desired uniformity of drive.

The elongated drive contact members (106, 108, 110, etc.) can be selected to desired dimension in the circumference of configuration 90, which dimension can be dependent in part on the belt and curved path specifications. One objective is to adequately bridge adjacent vertically-oriented major axis leg portions of the belt edge for smooth, continuous and uniform dynamic frictional-drive contact along the inner perimeter of the belt in its curved path, free of vibration. The drive elements are preferably covered on their outer-periphery contact surface with a replaceable sleeve element of plastic, ceramic, or the like. Such sleeve element material is selected to provide desired relative-movement frictional contact with the vertically-oriented portion at the belt's inner perimeter edge. In place of, or in conjunction with, the sleeve elements on the drum, drive contact surfaces of the belt can be coated with a selected dynamic frictional material.

That is, the edge contact surfaces of the integral units can be selectively coated under certain circumstances. Drive contact portions on the inner perimeter of the belt are selected and disposed in the curved path such that the peripheral drive source surface of each drum-configuration member 106, 108, 110, etc., is in continuous contact with both contiguous integral units during passage from one to another. The circumferential width of the rotary drive contact surfaces can be selected to establish desired contact for uniform drive purposes. For example, during transition from one integral unit to another, a drum contact surface is in contact with two such contiguous integral units at a time such that the transition from one to another occurs evenly without imparting any widthwise (radially-directed) movement of the belt.

And, such plurality of spaced drive contact surfaces are distributed around the drum periphery such that each contact member travels from one leg portion to another, at the various levels of the graded belt path, so that the frictional drive contact is essentially continuous and uniformly distributed around the defined circumferential surface and at the levels of various belt paths 94–99.

As a result, the frictional drive is substantially uniform about the periphery of the defined drum configuration surface at the selected drum speed. And such drive direction can be readily reversed in coordination with reversal of the belt support and movement means exterior to the curved path drive. The coaction of the integrally-joined belt units and spaced drive elements 106, 108, 110, etc., enable a uniformity of drive around the full periphery of the multiple layers. Also, the spaced drive elements (106, etc.) can be oriented in the circumferential periphery of the drum configuration other than extending perpendicularly between top and bottom of the drum configuration. The disposition in the defined circumferential periphery is selected to achieve and maintain substantially uniform frictional drive throughout the curved travel path.

The drum-defining drive contact surfaces travel, for dynamic frictional drive purposes, at a greater peripheral velocity than that of the vertically-oriented inner perimeter contact surface of the belt. Such relative motion factor provides the dynamic character of the frictional drive, and can have other advantages with present teachings. The objective is to have smoothly-operated contact between the vertically-oriented integrally-joined units of the belt and the drum configuration contact members so as to provide for uniformity of drive.

In the specific embodiment, the drive surfaces of a plurality of drum contact members (106, 108, 110, etc.) will each be in surface contact with the lateral edge of the driven belt in each circumscribing layer (94–99) of the belt. The contact at different levels by peripherally spaced drive elements helps to maintain the desired uniformity of frictional drive, and that uniformity is facilitated by drive surface velocity greater than that of the inner perimeter vertically-oriented surface of the belt. That result is also facilitated by the multiple contacts, vertically and peripherally distributed, which tend to facilitate uniformity of frictional drive force vertically and peripherally of the drum configuration.

Reliable control of dynamic frictional drive is also augmented by a centrifugal force factor as exerted by the inner perimeter of the edge of the belt on the drum-defining drive contact surfaces (104, etc.). The relative speed between the belt and driving members, such centrifugal (gripping) force on the driving surface(s), and the load on the belt are factors in achieving desired control. For example, increasing centrifugal force exerted by the belt, increasing the relative speed and/or increasing the belt load can act to increase the dynamic frictional drive force exerted or required.

During movement of the belt externally of the curved path in the embodiment of FIGS. 10 and 11, the belt is supported and directed by a series of guide and/or idler rollers indicated generally at 120. While the belt is being driven in the tower by the dynamic frictional contact of the belt with the drum-defining surface(s), movement of the belt over rolls external to the curved path is carried out in a manner to move and guide the belt while avoiding undue longitudinal tension or undue slack in the belt.

The external movement roll means are used to control feed of the belt into or from the curved path, and to effect the centrifugal (gripping) force of the belt on the drum defining frictional drive surface(s). The objective is to feed the belt horizontally into the curved path so it can be driven by dynamic frictional contact; part of the objective in feeding the belt into or removing the belt from the curved path is to avoid tightening the belt so that its travel through the curved path remains substantially horizontal. That is, belt travel exterior to the curved path is controlled to avoid restraints on entry of the belt into the curved path which tend to turn the belt out of the horizontal, rotating it about its inner edge. Also, looseness or slack in the belt as fed into the curved path tends diminish the desired dynamic frictional drive along the curved path. Control of the belt movement exterior to the curved path and coordination with drive rate of the drum facilitate desired control of dynamic frictional drive.

Referring to FIG. 10, the belt can enter or exit its curved travel path at the upper level of the tower, as indicated by arrow 122; or the belt can exit or enter (on the same diametric side of the drum configuration) at the lower level of the tower, as indicated by arrow 124. Exit on the same diametric side facilitates in-line travel avoiding any twisting of the belt to achieve desired return. The belt can enter at the lower level and exit at the upper level, or vice versa, since the direction of belt movement can be readily reversed (at drive motor means 126 for the drum in coordination with the external belt motor movement means 128). Drive means 126 and 128 are coordinated and controlled to carry out dynamic frictional concepts of the present invention; in effect, the external movement and support means are for purposes of serving the frictional drive in the curved path; and such exterior means should not be pushing or pulling the belt unduly into or from the curved path, nor unduly impeding belt feed into or withdrawal of the belt from the curved path tower in a manner which would detrimentally effect dynamic frictional drive.

The travel path orientation of the belt extends substantially horizontally, as shown in cross section in a vertically-oriented plane of FIG. 6, between lateral sides of the belt. In the tower embodiment shown, the belt is only inclined slightly in its lengthwise direction due to the multi-layer travel path around the defined drum surface configuration; such inclination is determined by drum height and the number of circumscribing layers.

The following data relate to belt and curved path tower specific embodiments of FIGS. 9, 10, 11:

| | |
|---|---|
| Belt length | 110 feet |
| Drum configuration diameter | 26 inches |
| Number of circumscribing turns | 9 |
| Belt speed | about 1 to about 40 FPM |
| Drum speed | about ¼ to about 20 RPM |
| Belt width | about 4" to about 10" |
| Drum drive motor (124) | ¼ hp |
| External belt movement and guide motor (128) | 1/16 hp |
| External belt support elements | (PVC or metal) sprockets (metal or rubber) support rollers |
| Metal wire spirals (gage) (ASME J-304 stainless steel) (steel or other wire alloy, aluminum, brass, coated steel, or other suitable conveyance wire material including plastic) | 20 to 6 |
| Rods (gage) (ASME J-304 stainless steel) (steel or other wire alloy, aluminum, brass, coated steel, or other suitable conveyance wire material including plastic) | 20 to 4 |
| Helical Loops | |
| Major axis — range (Pitch) | ¼" to 4" |
| Minor axis — range (Spread) | 1/16" to 1" |

For dynamic frictional drive purposes, the peripheral speed of the drum configuration is maintained greater than that of the inner-perimeter surfaces of the belt in its curved travel path.

The specific values, materials and dimensions disclosed herein are not intended to limit the range of practical application for the invention; for example, belt widths of ten to twelve feet can be fabricated and utilized when accompanied by proportional expansion of support structures and drive means. Also, it is to be understood that those skilled in the art, in the light of present teachings, can extend principles of the invention to embodiments other than as specifically illustrated and described; therefore, reference shall be made to the appended claims for purposes of determining the scope of the present invention.

We claim:

1. Method for fabricating an elongated continuous-length woven-wire belt for direct-contact dynamic-frictional-drive while moving in a path which is curved in a lateral direction with respect to the lengthwise direction of the belt, comprising the following steps:

(A) providing a plurality of elongated spiral wires of preselected gage which present a plurality of dimensionally-uniform helically-wound loops having the same configuration as viewed in a plane which is perpendicularly transverse to the centrally located axis of each spiral wire, such helically-wound loops of each spiral wire being symmetrical in such plane in relation to each such respective centrally located axis and being substantially uniformly distributed along the length of each such centrally located axis, with each such loop presenting an elongated-oval toroid-like configuration in such perpendicularly transverse plane with uniform internal dimensions and uniform external dimensions throughout the length of each such spiral wire, the elongated-oval internal configuration of each loop presenting a major axis and a minor axis as viewed in such perpendicularly transverse plane, the major axis extending between bight ends of the elongated-oval internal loop configuration, with such major axis being disposed generally in the lengthwise direction of the belt in a plan view of the work-product carrying surface to be presented by the belt being assembled;

(B) providing elongated substantially-rigid connector rods of a preselected gage enabling a pair of such rods to be inserted within the ellipse-like internal configuration of the loops to extend between longitudinal ends of the spiral wire across the width of the woven-wire belt, such pair of rods being capable, as inserted, of being moved within such internal configuration of the loops in the general lengthwise direction of the belt being assembled;

(C) placing a pair of the elongated spiral wires such that internal configurations of their respective loops overlap at one bight end each of the loops for each spiral wire, such overlapping relationship enabling insertion of a single connector rod to interconnect such two spiral wires along their lengths at such one bight end of the loops each, (D) inserting a single connector rod for interconnecting such two spiral wires;

(E) placing an additional spiral wire in overlapping relationship at the remaining bight end of the loops of each such pair of connected spiral wires;

(F) inserting an additional single connector rod into the overlapping loops at each such remaining bight end, and with the work-product carrying surface of the belt being established, (G) fabricating lateral side portions of the belt by
  (i) preparing connector rods and spiral wires to designated lengths for integrally joining distal ends of one of such rods and one of such spiral wires at a location that is contiguous to each lateral edge of the belt, and
  (ii) disposing each such connector rod and spiral wire for integral joining along each lateral side of the belt;

(H) integrally joining the distal end of such one spiral wire to the respective contiguous longitudinal distal end of such one inserted connector rod along each such lateral side, so as to form an integral joint which constitutes a portion of the lateral edge along each respective lateral side of the belt, such joining of distal ends at both lateral sides of the belt forming an integral unit of such one connector rod and such one spiral wire without disturbing the capability for pivotal movement of the integral unit at the remaining bight end of the helical loop of such one integrally-joined spiral wire;

(I) continuing to interconnect distal ends of a single spiral wire with adjacent distal ends of a single connector rod to form an integral unit without disturbing the capability for pivotal interconnection at the remaining bight end of the helically-wound loops of the integrally-joined spiral wire, and (J) continuing to form such integrally-joined connector rod and spiral wire units, such that
  each such integrally-joined connector rod and spiral wire, acting as a single integral unit, is pivotally connected to a similar lengthwise-contiguous single integral unit of connector rod and spiral wire so as to fabricate a plurality of such integral units into a belt of desired length, and (K) presenting a vertically-oriented lateral edge portion along at least one lateral side of the belt providing for dynamic frictional drive by vertically-oriented curvilinear surface drive means located in a travel path which is curved laterally in relation to the lengthwise direction of such belt, such drive means being disposed, during travel of the belt in such a curved path, on the inner perimeter of the belt while in such curved path with the work-product carrying surface being substantially horizontally-disposed in such curve path, and with the woven-wire belt being collected lengthwise along such inner perimeter when in such curved path with such integrally-joined units presenting an inner-perimeter portion for substantially continuous dynamic frictional drive of the belt by such rotational-drive means in such curved path.

2. The method of claim 1, including
providing metal wire which is flattened on at least two diametrically opposite surfaces for helically-winding such spiral wires, and
helically-winding such flattened surface wire into a spiral wire so as to present a flattened exterior surface on each helically-wound loop providing a flat-contoured work-product conveyor carrying surface for such belt.

3. The method of claim 2, in which the remaining diametrically-opposite flattened surface of each such spiral wire loop presents an internal elongated-oval configuration providing a flat surface for contact with a connector rod for pivotally interconnecting two adjacent integrally-joined units each consisting of a connector rod and a spiral wire,
such pivotal interconnecting of adjacent internally-joined rod and wire units enabling such integral units, while in such continuous length belt, to selectively move relative to each other in the lengthwise direction of the belt toward a lengthwise collected position upon entering such curved path and also to move lengthwise from such a collected position to return to a lengthwise extended position for the belt upon exit from such curved path,
such fabrication of the woven-wire belt enabling lengthwise collection uniformly across the width of the belt in quantitatively small increments while the belt is moving into such curved-path and while the belt is moving in such curved path so as to gradually accommodate, across the belt width, for the differential between inner and outer perimeter rates of movement of the woven belt while travelling into and through such curved path, and
such fabrication enabling gradual return to full extended position as the belt travels out of such curved path during which the frictionally driven belt was in at least a partially nested position on its inner perimeter during travel in such curved path.

4. The method of claim 1, in which such vertically-oriented portion is disposed generally perpendicularly to the work-product carrying surface.

5. The method of claim 4, in which such a vertically-oriented edge portion is
disposed to extend vertically upwardly in relation to such load-carrying surface on both lateral edges to assist containment of work product on such belt.

6. The method of claim 5, including
selecting the height of such vertically-oriented edge portions to have a dimension in the range of about half to about ten times the minor axis dimension of a spiral wire loop.

7. The method of claim 2, in which
such metal spiral wires and connector rods are cut to desired lengths, and
bending of lateral edge portions is carried out to present a flattened major-axis leg surface of a single loop along at least one lateral edge of the belt for use in dynamic frictional-drive of such belt along such curved path.

8. The method of claim 1, including
preselecting connector rods which are crimped in a uniformly undulating manner along their longitudinal dimension for pivotally-interconnecting such integrally-joined units by providing a seat for receiving a single bight end of each helically-wound loop of the overlapping spiral wire of each adjacent integrally-joined unit for the extended-length woven-wire belt being fabricated.

9. The method of claim 3, including
preselecting metal connector rods which are crimped uniformly along their lengths, and preselecting the gage of wire for the connector rods and spiral wires in coordination with preselection of the major axis dimension for the helically-wound loops of the spiral wires such that the woven-wire belt formed is capable of being collected by lengthwise relative movement of each such rod and wire integral unit into a next adjacent integral unit a distance which is a multiple of the gage of such connector rod, such distance being in the range from about 1.5 to about ten times such connector rod gage, such lengthwise collection of the fabricated woven-wire belt enabling incrementally-small relative movement between such integrally-joined rod and wire units uniformly across the width of such belt when such belt is traveling into such curved path with such relative movement across the width of the belt acting as a differential to uniformly compensate for the differing rates of movement between such inner and outer perimeters of the woven-wire when travelling in such curved path.

10. Assembly method for curved path structure for use with the woven-wire belt of claim 1, 3 or 8, comprising the steps of:

establishing belt support means for a curved travel path which curves in a lateral direction with relation to the lengthwise direction of the woven-wire belt, the curved travel path being established to support a belt width such that the belt is in an at least partially collected lengthwise disposition contiguous to its inner perimeter in such curved travel path, and providing for substantially continuous dynamic frictional drive contact along such inner perimeter of the belt while a portion of the belt contiguous to its outer perimeter is at least partially extended lengthwise during such travel in such curved path.

11. The assembly method of claim 10, including supporting the curved travel path to establish multiple layers circumscribing a substantially-cylindrical rotatable drum-like configuration, and positioning peripherally-spaced vertically-oriented drive elements to define such drum-like configuration to enable such belt to be frictionally driven along its inner perimeter by such vertically-oriented elements.

12. Assembly method for curved path structure for use with the woven-wire belt of claim 1, comprising the steps of:

establishing belt support means for a curved travel path which curves in a lateral direction with relation to the lengthwise direction of the woven-wire belt, the curved travel path being established to support a belt width such that the belt is in an at least partially collected lengthwise disposition contiguous to its inner perimeter for frictional drive purposes while a portion of the belt contiguous to its outer perimeter is at least partially extended lengthwise during such travel in such curved path.

13. The assembly method of claim 10, including presenting a plurality of vertically-disposed drive elements to define a curved peripheral path of rotation which is substantially-circular in a plane which is perpendicularly transverse to the axis of rotation of such vertically-disposed elements, and in which such drive elements are positioned circumferentially so as to substantially preclude radially-directed movement of the belt due to such dynamic frictional drive contact with such belt in such curved path.

14. Operating method for a curved-path support structure assembled in accordance with the method of claim 10, comprising providing for controlling rotation of such drum-like configuration to effect dynamic frictional drive of such belt, and controlling the velocity of the periphery of the drum-like configuration to exceed the velocity of the inner perimeter surface of such belt.

15. Operating method for a curved-path support structure assembled in accordance with the method of claim 11, comprising providing means for separately controlling rate of rotation of such drum-like configuration and controlling rate of movement of the woven-wire belt when exterior to such curved path support structure, and in which such rates of movement are coordinated such that the rate of movement of such peripheral surface of such drum-like configuration exceeds that of the inner periphery of the woven-wire belt when in such curved path.

16. The operating method of claim 15, further including quantitatively controlling rate of longitudinal movement of such belt while exterior to such curved path, such that the woven-wire belt is fed into and removed from such curved path in a substantially-horizontal disposition.

17. The operating method of claim 11, in which the belt is collected lengthwise into a nested position on such inner perimeter while progressively extending from such nested position in approaching the outer perimeter of the belt to gradually and uniformly accommodate differing rates of movement of such inner and outer perimeters across belt width as the belt enters, travels through, and exits from such curved path.

18. Operating method for a support structure assembled in accordance with the method of claim 10, comprising selectively controlling rotation of vertically-oriented drive means within such curved path so as to move at a rate of movement which is greater than the rate of movement of the inner perimeter lateral edge of such belt in such curved path, so as to selectively control rate of movement of the woven-wire belt in such curved path.

19. An elongated continuous-length woven-wire belt fabricated in accordance with the method of claim 1 to provide for direct-contact lateral-edge dynamic-frictional-drive thereof.

20. An elongated continuous-length woven-wire belt for direct-contact lateral-edge dynamic-frictional-drive fabricated in accordance with the method of claim 3 or 8.

21. A curved path support structure for support of a continuous-length woven-wire belt which is fabricated in accordance with the method of claim 3 or 4, such support structure being assembled and operated in accordance with the method of claim 14.

22. A curved path support structure for support of a continuous-length woven-wire belt which is fabricated in accordance with the method of claim 8, such support structure being assembled and operated in accordance with the method of claim 14.

* * * * *

UNITED STATES PATENT AND TRADEMARK OFFICE
CERTIFICATE OF CORRECTION

PATENT NO. : 5,375,695

DATED : December 27, 1994

INVENTOR(S) : Ronald G. Daringer et al.

It is certified that error appears in the above-identified patent and that said Letters Patent is hereby corrected as shown below:

In column 5, line 20, delete "some-oriented" and substitute --some oriented--;
   line 42, delete "bent. Such" and substitute --bent such --;
   line 55, after "sides" insert --of--.

Signed and Sealed this

Ninth Day of May, 1995

*Attest:*

BRUCE LEHMAN

*Attesting Officer*    *Commissioner of Patents and Trademarks*